(12) United States Patent
Brown et al.

(10) Patent No.: US 7,142,971 B2
(45) Date of Patent: Nov. 28, 2006

(54) SYSTEM AND METHOD FOR AUTOMATICALLY CONTROLLING A PATH OF TRAVEL OF A VEHICLE

(75) Inventors: Eric D. Brown, Huntington Beach, CA (US); Douglas C. Cameron, Seal Beach, CA (US); Krish R. Krothapalli, Redondo Beach, CA (US); Walter von Klein, Jr., Long Beach, CA (US); Todd M. Williams, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/369,285

(22) Filed: Feb. 19, 2003

(65) Prior Publication Data

US 2004/0162670 A1    Aug. 19, 2004

(51) Int. Cl.
*G06F 19/00* (2006.01)
(52) U.S. Cl. .................. 701/110; 701/23; 701/25; 701/26; 244/183
(58) Field of Classification Search ........... 701/2–3, 701/9–16, 36, 23–26, 120–122, 300–302, 701/110; 340/945, 947, 961, 963, 573.1; 244/118.5, 75 R, 183–197
See application file for complete search history.

(56) References Cited

U.S. PATENT DOCUMENTS

| | | | | |
|---|---|---|---|---|
| 3,665,386 | A * | 5/1972 | Dosch ........................ | 180/287 |
| 4,314,341 | A * | 2/1982 | Kivela ........................ | 701/16 |
| 4,622,667 | A * | 11/1986 | Yount ........................ | 714/11 |
| 4,924,401 | A * | 5/1990 | Bice et al. .................. | 701/6 |
| 5,053,964 | A * | 10/1991 | Mister et al. ................ | 701/19 |
| 5,085,287 | A * | 2/1992 | Utsumi et al. ............... | 180/179 |
| 5,223,844 | A * | 6/1993 | Mansell et al. .............. | 342/357.07 |
| 5,510,991 | A * | 4/1996 | Pierson et al. ............... | 701/11 |
| 5,547,208 | A * | 8/1996 | Chappell et al. ............. | 180/281 |
| 5,559,491 | A * | 9/1996 | Stadler ....................... | 340/426.25 |
| 5,781,103 | A * | 7/1998 | Gilling ....................... | 340/441 |
| 5,904,724 | A * | 5/1999 | Margolin ..................... | 701/120 |
| 6,278,913 | B1 * | 8/2001 | Jiang .......................... | 701/3 |
| 6,356,802 | B1 * | 3/2002 | Takehara et al. ............. | 700/215 |
| 6,405,107 | B1 * | 6/2002 | Derman ....................... | 701/3 |
| 6,584,383 | B1 * | 6/2003 | Pippenger .................... | 701/3 |
| 6,636,786 | B1 * | 10/2003 | Partel ......................... | 701/3 |
| 6,641,087 | B1 * | 11/2003 | Nelson ........................ | 244/118.5 |
| 6,658,572 | B1 | 12/2003 | Craig .......................... | 713/200 |

(Continued)

FOREIGN PATENT DOCUMENTS

CN           1343605 A        4/2002

(Continued)

*Primary Examiner*—Gertrude A. Jeanglaude
(74) *Attorney, Agent, or Firm*—Alston & Bird LLP

(57) ABSTRACT

The method and system for automatically controlling a path of travel of a vehicle include engaging an automatic control system when the security of the onboard controls is jeopardized. Engagement may be automatic or manual from inside the vehicle or remotely via a communication link. Any onboard capability to supersede the automatic control system may then be disabled by disconnecting the onboard controls and/or providing uninterruptible power to the automatic control system via a path that does not include the onboard accessible power control element(s). The operation of the vehicle is then controlled via the processing element of the automatic control system. The control commands may be received from a remote location and/or from predetermined control commands that are stored onboard the vehicle.

44 Claims, 2 Drawing Sheets

U.S. PATENT DOCUMENTS

Figure 1:
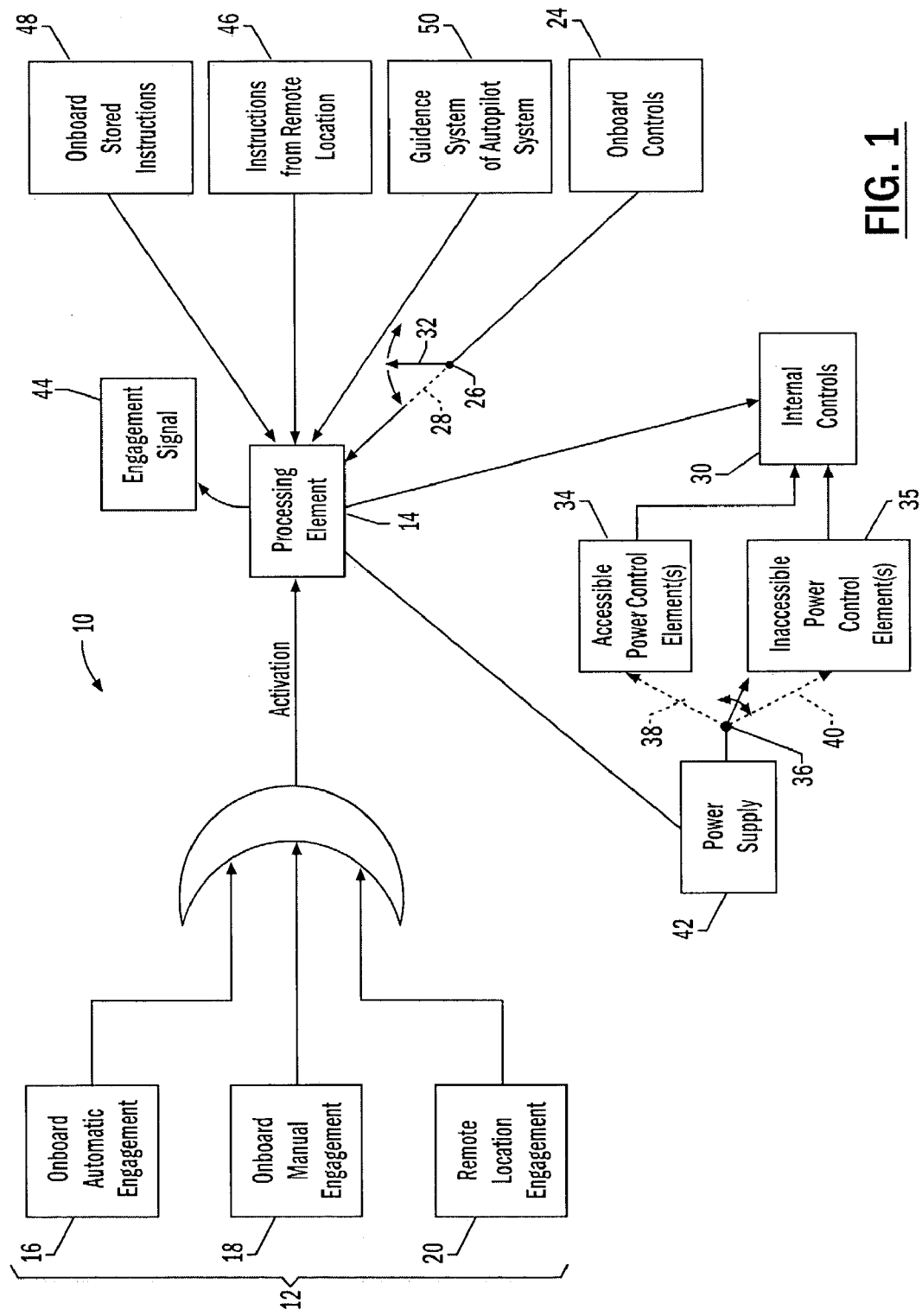

| | | | |
|---|---|---|---|
| 6,701,231 B1* | 3/2004 | Borugian | 701/30 |
| 6,739,556 B1* | 5/2004 | Langston | 244/189 |
| 6,791,208 B1* | 9/2004 | Pfeiffer | 307/64 |
| 2003/0067379 A1* | 4/2003 | Riley | 340/5.53 |
| 2003/0144769 A1* | 7/2003 | Meier | 701/3 |
| 2004/0078118 A1* | 4/2004 | Binder | 701/1 |
| 2004/0107028 A1* | 6/2004 | Catalano | 701/2 |
| 2004/0249523 A1 | 12/2004 | Du | 701/9 |
| 2005/0033487 A1* | 2/2005 | Esculier | 701/3 |

FOREIGN PATENT DOCUMENTS

| | | |
|---|---|---|
| EP | 1314644 A | 5/2003 |
| EP | 1422680 A | 5/2004 |
| WO | WO 0248968 A | 6/2002 |
| WO | WO 03039956 A1 | 5/2003 |

* cited by examiner

SYSTEM AND METHOD FOR AUTOMATICALLY CONTROLLING A PATH OF TRAVEL OF A VEHICLE

BACKGROUND OF THE INVENTION

The present invention relates to the automatic control of the path of travel of a vehicle and, in particular, to techniques for automatically controlling the path of travel of a vehicle that cannot generally be superseded or disengaged from onboard once the automatic control system is engaged.

Security onboard any type of vehicle, particularly a passenger vehicle, such as an air vehicle, ship, boat, train, bus, or the like, is an imperative aspect of the vehicle operations. In particular, it is crucial that the personnel authorized to operate a particular vehicle, such as pilots onboard an aircraft, are the only individuals permitted to have control over the operations of the vehicle, which include taking-off, landing, and the flight of an aircraft, for example. If anyone without authorization to operate a vehicle, particularly a passenger vehicle or vehicle carrying hazardous cargo, obtains control over the operations of the vehicle, the potential consequences could be catastrophic. Particularly catastrophic is a situation in which unauthorized person(s) fly an aircraft carrying passengers and/or any type of harmful material into a densely populated area where the aircraft crashes. As such, various techniques for restricting access to the operational controls of a vehicle have been developed.

For example, one technique for restricting access to the controls of a vehicle involves utilizing a door, such as a cockpit door in an aircraft, to the area where the controls and the authorized operators of the vehicle are located. The door securely locks and may be made of bullet-proof material. Thus, once the authorized operators of the vehicle are in position at the controls of the vehicle, they may lock the door and therefore prevent anyone else from gaining access to the travel controls of the vehicle. Typically, the door may be unlocked only by the authorized operators of the vehicle. In addition, because the door may be made of bullet-proof material, even if someone outside the door tried to forcibly enter through the door, their attempts would be unsuccessful. The general idea behind the locking, bullet-proof door is that even if the security of the rest of the vehicle is jeopardized, the authorized operators will be protected and capable of safely bringing the vehicle to a stop, such that authorities can help resolve the threat onboard the vehicle. The downfall to this security technique, however, is that the operators are capable of unlocking and opening the door, such that at least one of the operators may decide to open the door depending upon the circumstances of the situation. For example, one of the operators may decide to open the door if there is a threat to the physical safety of one or more of the other personnel and/or passengers onboard the vehicle. As such, an operator may decide that the risk to the physical safety of one or more of the other personnel and/or passengers onboard the vehicle is greater if the door remains locked than if the door is opened. Once the door is opened, however, the chances of safely bringing the vehicle to a stop where authorities can help resolve the threat onboard the vehicle greatly decreases.

Another technique for increasing the safety onboard a vehicle is to employ an armed guard on every operating vehicle, such as the air marshals onboard some aircraft. The armed guard is authorized to eliminate any threat to the safety of the vehicle and/or the passengers and personnel onboard the vehicle. Therefore, if an individual onboard the vehicle attempts to gain access to any restricted area of the vehicle, such as the cockpit and/or the flight controls of an air vehicle, the armed guard is authorized and trained to prevent that individual from gaining access to the restricted areas. This security technique has various downsides, however. Similar to the locking, bullet-proof door example, the armed guard also has the decision-making power regarding the course of action depending upon the circumstances of each situation. For instance, the armed guard may decide not to try to prevent an individual from gaining access to a restricted area if there is a threat to the physical safety of one or more of the other personnel and/or passengers onboard the vehicle. The armed guard may decide that the risk to the physical safety of one or more of the other personnel and/or passengers onboard the vehicle is greater if the armed guard tries to prevent the individual from gaining access to the restricted area than if the individual gains access to the restricted area. In addition, if more than one individual onboard the air vehicle aids in the attempt to gain access to a restricted area, they may be able to overpower the armed guard. Because there is no way to know how many armed guards would be needed to prevent more than one individual from threatening the safety of the vehicle, and because it is not economically or practically feasible to have a team of armed guards on each vehicle, the armed guard security technique is not capable of preventing all security threats to a vehicle.

In light of the shortfalls of the above described security techniques, particularly with respect to preventing unauthorized persons from accessing the flight controls of an aircraft, there is a need in the industry for a technique that conclusively prevents unauthorized persons from gaining access to the controls of a vehicle and therefore threatening the safety of the passengers onboard the vehicle, and/or other people in the path of travel of the vehicle, thereby decreasing the amount of destruction individuals onboard the vehicle would be capable of causing. In particular, there is a need for a technique that ensures the continuation of the desired path of travel of a vehicle by removing any type of human decision process that may be influenced by the circumstances of the situation, including threats or further violence onboard the vehicle

BRIEF SUMMARY OF THE INVENTION

The methods and systems of the present invention for automatically controlling a path of travel of a vehicle and, in one embodiment, for engaging an uninterruptible autopilot mode provide techniques that prevent unauthorized persons from accessing the controls of a vehicle. The methods and systems therefore increase the likelihood that a vehicle may be safely operated to safety because unauthorized persons are not capable of gaining any type of control over the operations of the vehicle. To provide the increased safety, the techniques of the present invention permit irrevocable and uninterrupted automated control of the vehicle, such that once the automated control system is engaged, it cannot be disengaged by anyone onboard the vehicle. Thus, the personnel onboard the vehicle cannot be forced into carrying out the demands of any unauthorized person. The method and systems of the present invention, therefore, provide techniques for increasing the safety of vehicles over the conventional safety techniques that are revocable and/or alterable.

The method and system for automatically controlling a path of travel of a vehicle may include engaging an automatic control system of the vehicle, such as by manually engaging the automatic control system from onboard the vehicle or automatically engaging the automatic control system when the security of the onboard controls is jeopardized. In other embodiments, a communication link may be present between the vehicle and at least one location off-board the vehicle, such that the automatic control system may be remotely engaged from a location off-board the vehicle, i.e., a remote location, via the communication link. The automatic control system may be engaged such as by an engagement element. Prior to engaging the automatic control system, a signal indicating that the safety of the vehicle is jeopardized may be received. For instance, the personnel onboard the vehicle may receive a signal indicating that the safety of the vehicle is jeopardized from a remote location or onboard the vehicle. In addition, a remote location may receive such a signal from the vehicle, automatically from its own monitoring of the vehicle, and/or from any other location that may be monitoring the vehicle.

The method and system also include disabling, such as via a processing element, any onboard capability to supersede the engaged automatic control system. For instance, any onboard capability to disengage the engaged automatic control system may be disabled and/or the onboard controls may be disconnected. In other embodiments, at least one onboard accessible power control element, such as circuit breakers, of the vehicle may be bypassed by providing power to the automatic control system from an alternative power control element that is inaccessible.

The operation of the vehicle is then controlled via the processing element of the automatic control system. In embodiments of the present invention that include a communication link between the vehicle and at least one location off-board the vehicle, the automatic control system may receive control commands from the off-board location to control the operation of the vehicle. In addition to or as an alternative to the control commands received from the off-board location, the control system may receive predetermined control commands that are stored onboard the vehicle, such as in a storage element, and may execute the commands to control the operation of the vehicle. The automatic control system may therefore determine the navigation path and any other operation of the vehicle.

In further embodiments of the method and system for automatically controlling a path of travel of a vehicle involves automatically controlling flight operations of an air vehicle by engaging an automatic control system of the air vehicle, such as via at least one engagement element. In addition, any onboard capability to supersede the engaged automatic flight control system is disabled; and the air vehicle operations are controlled via the automatic flight control system, such as by a processing element. For example, the automatic control system controls a flight operation of the air vehicle and/or a landing operation of the air vehicle.

Other aspects of the method and system of the present invention include engaging an uninterruptible autopilot mode to automatically control flight operations of an air vehicle. As such, an autopilot system of the air vehicle may be initiated, such as by transmitting an uninterruptible autopilot mode signal from onboard the air vehicle to the autopilot system. For instance, the uninterruptible autopilot mode signal may be transmitted automatically upon the occurrence of an event onboard the air vehicle. In other embodiments, the uninterruptible autopilot mode signal may be transmitted from a remote location to the autopilot system. After initiating the autopilot mode, a signal may be transmitted to at least one remote location from the air vehicle to indicate that the uninterruptible autopilot mode of the air vehicle has been engaged.

The onboard manual flight controls are disconnected and an onboard manual power control element is bypassed to directly connect the autopilot system to a power supply, such as by a switching element. As such, the uninterruptible autopilot mode of the air vehicle is engaged. The air vehicle then is automatically navigated and flown without input from onboard the air vehicle, such as by a processing element. Thus, the air vehicle may be automatically navigated away from populated areas and/or to one of a plurality of predetermined landing sites where the air vehicle may be automatically landed. In some embodiments of the system of the present invention, the processing element may be included in the autopilot system, while in other embodiments, the processing element is separate from the autopilot system.

The methods and systems of the present invention therefore provide techniques for automatically navigating, flying and/or landing an air vehicle in such a manner that unauthorized persons may not gain access to the flight controls of the air vehicle. In addition, once the automatic control system provided by the present invention is initiated, no one on board the air vehicle is capable of controlling the flight of the air vehicle, such that it would be useless for anyone to threaten violence in order to gain control of the air vehicle. The methods and systems of the present invention therefore ensure that the air vehicle will be safely navigated and/or landed regardless of the threats or actions of the unauthorized persons attempting to gain control of the air vehicle. These techniques are advantageous over the conventional techniques for preventing unauthorized persons from gaining control over an air vehicle because these techniques remove any type of human decision process that may be influenced by the circumstances of the situation.

BRIEF DESCRIPTION OF THE SEVERAL VIEWS OF THE DRAWING(S)

Figure 2:
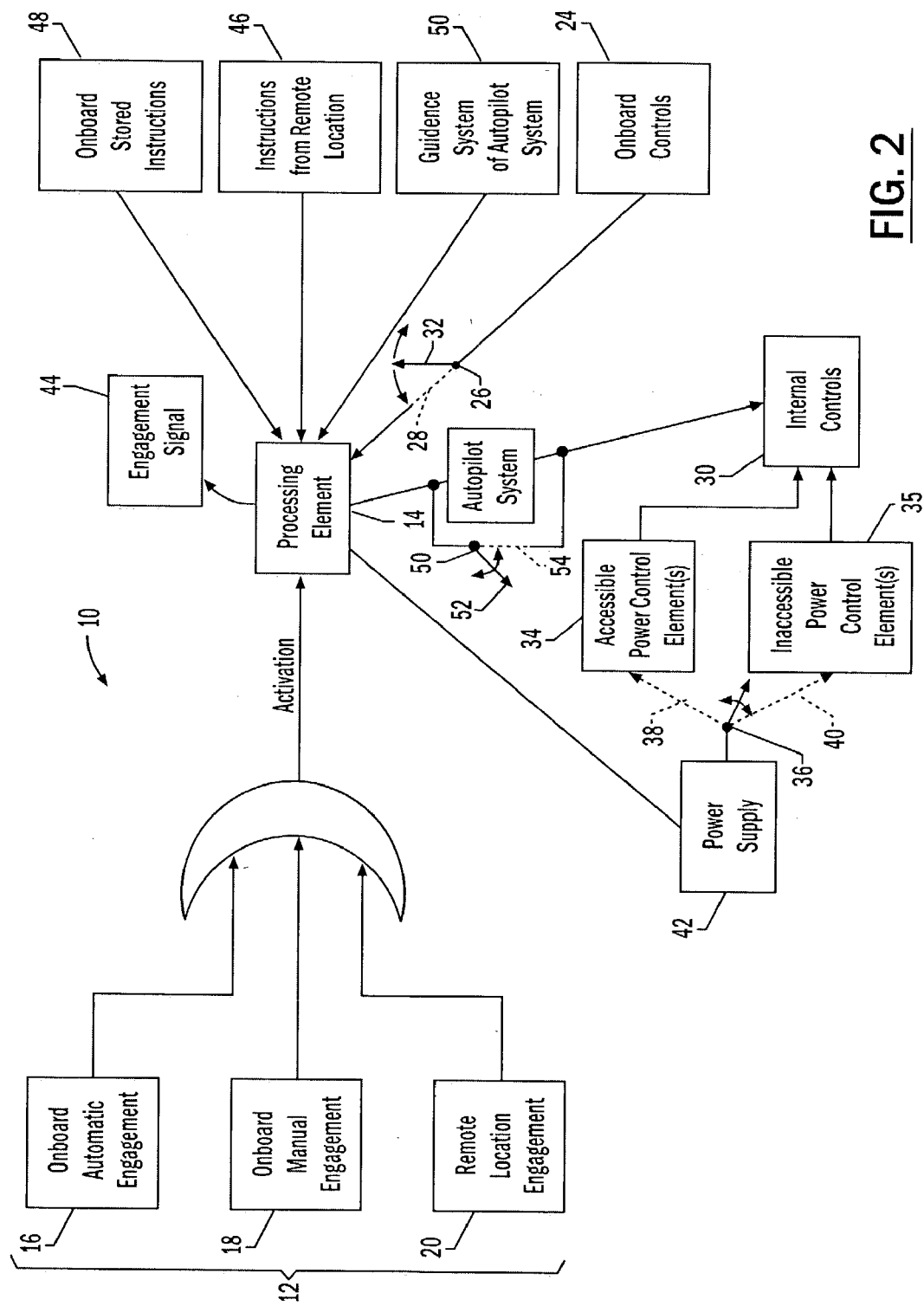

Having thus described the invention in general terms, reference will now be made to the accompanying drawings, which are not necessarily drawn to scale, and wherein:

FIG. 1 illustrates an automatic control system for automatically controlling vehicle operations according to one embodiment of the present invention; and FIG. 2 illustrates an uninterruptible autopilot system for automatically controlling air vehicle operations according to one embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The methods and systems for automatically controlling a path of travel of a vehicle of the present invention provide techniques that prevent unauthorized persons from accessing the controls of a vehicle. The methods and systems therefore increase the likelihood that a vehicle may be safely operated because unauthorized persons are not capable of gaining any type of control over the controls of the vehicle. To provide the increased safety, the techniques of the present invention permit irrevocable and uninterrupted automated control of the vehicle, such that once the automated control system is engaged, it cannot be disengaged by anyone onboard the vehicle. Thus, the personnel onboard the vehicle cannot be forced into carrying out the demands of any unauthorized person. The method and systems of the present invention, therefore, provide techniques for increasing the safety of vehicles over the conventional safety techniques that are revocable and/or alterable, such as based upon the demands of a hijacker or the like.

The methods and systems of the present invention apply to any type of vehicle, such as an air vehicle, boat, ship, train, bus or the like. The embodiments described below, however, are directed toward specific embodiments of systems and methods for automatically controlling aircraft flight operations. However, the methods and systems of the present invention apply equally to any other type of vehicle.

One embodiment of a system 10 for automatically controlling a path of travel of a vehicle includes at least one engagement element 12 and at least one processing element 14, as shown in the embodiments of FIGS. 1 and 2. An engagement element 12 may be any type of element that initiates the engagement of the automatic control system of a particular vehicle, such as the automatic flight control system of an aircraft. For example, an engagement element 12 may transmit a signal to the processing element 14 directing engagement of the automatic control system. As such, the engagement element may be, but is not limited to, a button, switch, lever, or the like, or any other device capable of transmitting a command to the processing element 14, such as a keyboard, a voice signal receiver, a touch-screen, or a selection device such as a mouse in conjunction with a display.

For instance, the automatic control system 10 may be activated automatically, as represented by box 16 of FIGS. 1 and 2. In one embodiment, the engagement element 12 may be a sensor or the like that automatically transmits an engagement signal to the processing element 14 upon sensing a particular event. Such sensors may be located anywhere in the vehicle where a type of threat to the security of the vehicle or its passengers or other contents may be sensed. For instance, in an aircraft, an engagement sensor may be located proximate to the door of the cockpit, and the sensor may be programmed to transmit an engagement signal to the processing element when the door is forcibly opened or when there is an attempt to forcibly open the door, such as repeated poundings on the door. The sensor(s) may have a minimum force threshold, such that force applied to the door must exceed the threshold before the automatic control system can be automatically activated. Therefore, at least most inadvertent applications of force on the door by people or objects will not cause the system to automatically engage. In addition to or instead of the automatic engagaement element(s) 16, the system 10 may include manual engagement element(s) 18, such as buttons, switches or the like, that authorized personnel, such as the pilots of an aircraft may actuate if a threat is detected. Thus, one or more manual and/or automatic engagement elements may be located onboard the vehicle, such as within and/or proximate the cockpit of an aircraft, as represented by boxes 16 and 18 of FIGS. 1 and 2. Furthermore, one or more locations outside the vehicle, i.e., one or more remote locations, but in communication with the vehicle, may include an engagement element, such that if a signal or other communication is received at the remote location that indicates the security of the vehicle may be in jeopardy, the engagement element may be activated from the remote location, as represented by box 20 of FIGS. 1 and 2 so as to assume control of the vehicle. For instance, an aircraft may be in communication with one or more remote locations, which may include but is not limited to an airline office, an airport, and one or more governmental agencies, such as a Federal Bureau of Investigation (FBI) office, a Central Intelligence Agency (CIA) office, a Federal Aviation Administration (FAA) office, the office of Homeland Security, a military center, or an anti-terrorist agency office. Personnel and/or equipment at the remote location may monitor the aircraft and may be capable of detecting certain events, such as indications from the flight crew or systems onboard the aircraft and/or movements of the aircraft that suggest the security of the aircraft is in jeopardy. Thus, one or more automatic and/or manual engagement elements may be located at the remote location, such that once it is determined that the security of the air vehicle is in jeopardy, the automatic flight control system 10 of the air vehicle may be automatically or manually engaged from the remote location by transmitting an activation signal to the processing element 14.

Communication between the vehicle and the remote location may be carried out in any manner known to those skilled in the art. For instance, the communication may be, but is not limited to being, conducted via a radio or satellite network. In addition, the communication link between the vehicle and the remote location may be dedicated for transmitting signals related to the automatic travel control system 10 only. As such, in one embodiment, these communications may be carried out by a transmitter and receiver, including an antenna, that is separate from all of the other communications transmitted and received by the vehicle. In other embodiments, the communications between the vehicle and the remote location may be carried out by the communication link(s) that are shared with other communications transmitted and received by the vehicle. In this embodiment, the signals related to the automatic travel control system may have a higher priority than the other signals carried by the communication link(s). Prioritization of communication signals, particularly in the case of air vehicle communication signals, is discussed in detail in U.S. Pat. application No. 09/994,259, filed on Nov. 26, 2001, and entitled "Methods and Systems for Air Vehicle Telemetry," which is incorporated herein by reference in its entirety.

Once the processing element 14 receives a signal that the automatic control system of the vehicle has been engaged by an associated engagement element 12, the processing element 14 then initiates control of the path of travel of the vehicle. In particular, the processing element disables any onboard capability to supersede or disengage the automatic control system. As such, in some embodiments of the automatic control system of the present invention employed onboard an aircraft, the processing element initiates control of the aircraft by activating the autopilot system 22 in conjunction with disabling any onboard capability to supersede or disengage the autopilot system, i.e., an uninterruptible autopilot mode, as shown in the embodiment of FIG. 2. Thus, in this embodiment, when the uninterruptible autopilot mode is engaged the autopilot switching element 50 opens, such that it moves from position 54 to position 52. In this embodiment, the processing element 14 may be part of the autopilot system 22 or the processing element 14 may be separate from the autopilot system 22.

In other embodiments, an automatic control system may be a system that is independent of the autopilot system, or the automatic control system may share only some flight control components with the autopilot system, as shown in the embodiment of FIG. 1. For instance, if the automatic control system and the autopilot system are separate systems, the automatic control system and the autopilot system may share the automatic throttle system and the automatic landing system or any other component or subsystem of the air vehicle that is common to both systems. Regardless of whether the automatic control system utilizes the autopilot system, the automatic control system controls the subsequent path of travel of the vehicle based upon a route that is either predetermined or calculated by the automatic control system, or that is provided to the automatic control system from an offboard location as described below.

To disable any onboard capability to supersede or disengage the automatic control system, the processing element 14 disables the onboard controls 24, which may include any type of interface, such as but not limited to an electronic or computer interface, with the controls of the vehicle. For example, when the automatic control system 10 is engaged, the onboard controls 24, including interfaces to the controls, may be bypassed. FIGS. 1 and 2 illustrate one embodiment of how the controls may by bypassed, although the controls may be bypassed in other manners. In the embodiment of FIGS. 1 and 2, a first switching element 26 may move from a first position 28 that connects the onboard controls 24 to the processing element 14 and, in turn, to the corresponding internal controls 30 of the vehicle, such as the flight control computer or the like, to a second position 32 that opens the connection between the onboard controls 24 and the corresponding internal controls 30, such that the onboard controls 24 are disabled. The first position 28 is typically the default position when the automatic control system 10 is not engaged.

In addition, the power control element(s) 34, such as circuit breakers or any other type of power limiting elements known to those skilled in the art, that are accessible onboard the vehicle are also bypassed when the automatic control system 10 is engaged, such that the automatic control system cannot be disengaged from onboard the vehicle by resetting the associated circuit breakers. FIGS. 1 and 2 also illustrate one embodiment of how the onboard accessible power control element(s) 34 may be bypassed, although the power control element(s) may be bypassed in other manners. A second switching element 36 may move from a first position 38 that connects the power to the automatic control system through the onboard accessible power control element(s) 34 to a second position 40 that connects the power to the automatic control system through inaccessible power control element(s) 35. In other embodiments for bypassing the onboard accessible power control element(s) 34, the inaccessible power control element(s) may not be necessary or may be part of the power supply, such that the second switching element 36 may move from the first position to a second position in order to directly connect the automatic control system to the power supply 42. Again, the first position 28 is typically the default position when the automatic control system 10 is not engaged.

The automatic control system may also be connected to a battery backup power supply, such that power to the automatic control system may not be interrupted, even if the electric power to the system is interrupted.

In addition to disabling any onboard capability to supercede or disengage the automatic control system, the processing element may also transmit a signal to any remote location(s), which may include but are not limited to an airline office, an airport, and one or more governmental agencies, such as a Federal Bureau of Investigation (FBI) office, a Central Intelligence Agency (CIA) office, a Federal Aviation Administration (FAA) office, the office of Homeland Security, a military center, and/or an anti-terrorist agency office, to indicate that the automatic control system of the vehicle has been engaged, as represented by box 44 of the FIGS. 1 and 2. This signal therefore alerts the necessary personnel at various locations that the security of the vehicle and/or the contents of the vehicle may be in jeopardy. In addition, the processing element 14 may transmit a signal to other vehicles, particularly those in close proximity, that the automatic travel control system has been engaged. Thus, the vehicles in close proximity will be alerted of the potentially hazardous situation facing the signaling vehicle, and can take precautions to ensure their safety, such as by giving the signaling vehicle a wide berth.

The processing element 14 also may receive commands for controlling the operation of the vehicle via the automatic control system in any manner known to those skilled in the art. When the automatic control system 10 is not engaged, then the processing element typically received commands for controlling the operation of the vehicle from the onboard controls 24. When the automatic control system 10 is engaged, however, the onboard controls 24 are disabled as described above, and the commands for controlling the operation of the vehicle are supplied from alternative sources. For example, as represented by box 46 of FIGS. 1 and 2, control commands may be transmitted to the processing element 14 from at least one remote location via a communication link, as described above. Thus, because the vehicle is in communication with the remote location, personnel and/or equipment at the remote location may transmit travel control commands to the processing element. Alternatively or in addition to control commands from a remote location, predetermined travel control commands may be stored onboard the vehicle, such as in a storage element, as represented by box 46 of FIGS. 1 and 2. Furthermore, the control commands may be generated by software onboard the vehicle or at a remote location that determines autonomous waypoints via a global positioning system (GPS) or inertial navigation system (INS). For instance, in one embodiment of the automatic control system employed onboard an air vehicle, at least a portion of the flight control commands may be generated by the GPS or INS of the air vehicle's autopilot system, as represented by box 50 of FIG. 1 and box 22 of FIG. 2.

The processing element 14 then transmits the control commands received from the remote location and/or the onboard storage element to the appropriate control component. For instance, flight control commands for an air vehicle may include but are not limited to commands for navigating the air vehicle away from populated areas, flying the air vehicle in a holding pattern, and automatically landing the air vehicle at a predetermined location, such as a military landing site.

Thus, the systems and methods for automatically controlling a path of travel of a vehicle provide techniques for automatically navigating any type of vehicle, such as an air vehicle, train, bus, ship, boat, or the like, in such a manner that unauthorized persons may not gain access to the controls of the vehicle. In addition, once the control system and method of the present invention is initiated, no one onboard the vehicle is capable of controlling the travel of the vehicle, such that it would be useless for anyone to threaten violence in order to gain control of the vehicle. The methods and systems of the present invention therefore ensure that the vehicle will be safely navigated regardless of the threats or actions of the unauthorized persons attempting to gain control of the vehicle. These techniques are advantageous over the conventional techniques for preventing unauthorized persons from gaining control over a vehicle because these techniques remove any type of human decision process that may be influenced by the circumstances of the situation.

As such, the automatic control system cannot be disengaged by anyone onboard the vehicle. In general, the safety and security of the vehicle and the contents of the vehicle should be ensured prior to disengaging the automatic control system. For instance, in one embodiment of the present invention as applied in an air vehicle, the automatic control system may be disengaged only when the air vehicle is on the ground and any threat to the safety or security of the air vehicle has been resolved. As such, only a ground crew trained in servicing the air vehicle may be capable of disengaging the automatic control system. In further embodiments, the automatic control system may be disengaged only on a vehicle at rest by a ground crew working in conjunction with authorized personnel, such as government and/or airline/railroad/public transportation or other types of officials, who have ensured there is no longer a threat to the safety or security of the vehicle and the contents of the vehicle. In other embodiments of the automatic control system, authorized personnel, such as government and/or airline/railroad/public transportation or other types of officials, may be able to disengage the automatic control system from a remote location while the vehicle is in operation, so long as the safety and security of the vehicle and the contents of the vehicle has been ensured.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for automatically controlling a path of travel of a vehicle comprising:
   engaging an automatic control system of the vehicle;
   disabling any onboard capability to supersede the engaged automatic control system, wherein disabling any onboard capability to supersede the engaged automatic control system comprises bypassing at least one onboard accessible power control element by providing power to the automatic control system in response to engagement of the automatic control system via an alternative power control element comprising at least one power limiting element that is inaccessible, wherein bypassing at least one onboard accessible power control element further comprises providing power from an alternative, inaccessible power supply via the alternative power control element comprising at least one power limiting element in response to engagement of the automatic control system; and
   controlling operation of the vehicle via the automatic control system.

2. The method according to claim 1, further comprising receiving a signal indicating the safety of the vehicle is jeopardized prior to engaging the automatic control system of the vehicle.

3. The method according to claim 1, wherein engaging the automatic control system comprises manually engaging the automatic control system from onboard the vehicle.

4. The method according to claim 1, wherein engaging the automatic control system comprises automatically engaging the automatic control system when the security of the controls onboard the vehicle is jeopardized.

5. The method according to claim 1, further comprising communicating with at least one location off-board the vehicle via a communication link between the vehicle and the at least one off-board location.

6. The method according to claim 5, wherein engaging the automatic control system comprises remotely engaging the automatic control system from the at least one location off-board the vehicle via the communication link.

7. The method according to claim 5, wherein controlling operation of the vehicle via the automatic control system comprises receiving control commands from the at least one location off-board the vehicle via the communication link and carrying out the control commands.

8. The method according to claim 1, wherein disabling any onboard capability to supersede the engaged automatic control system comprises disabling any onboard capability to disengage the engaged automatic control system.

9. The method according to claim 1, wherein disabling any onboard capability to supercede the engaged automatic control system comprises disconnecting onboard controls.

10. The method according to claim 1, wherein controlling operation of the vehicle via the automatic control system comprises receiving predetermined control commands stored onboard the vehicle and executing the predetermined control commands.

11. The method according to claim 1, wherein engaging an automatic control system comprises engaging an automatic flight control system of an air vehicle, wherein disabling any onboard capability to supersede the engaged automatic control system comprises disabling any onboard capability to supersede the engaged automatic flight control system, and wherein controlling operation of the vehicle comprises controlling operation of the air vehicle via the automatic flight control system.

12. The method according to claim 11, wherein controlling operation of the air vehicle via the automatic flight control system comprises determining a navigation path of the air vehicle to control at least one of a flight operation of the air vehicle and a landing of the air vehicle.

13. The method according to claim 1, further comprising establishing communications relating to the automatic control system via a dedicated communications link between the vehicle and a remote location, wherein the dedicated communications link is distinct from any communications link established for other types of communications.

14. The method according to claim 1, wherein the at least one power limiting element comprises at least one circuit breaker.

15. A system for automatically controlling a path of travel of a vehicle comprising:
   at least one engagement element capable of engaging an automatic control system of the vehicle; and
   at least one processing element capable of disabling any onboard capability to supersede the engaged automatic control system and any onboard capability to disengage the engaged automatic control system, and wherein said processing element is capable of receiving instructions for controlling operation of the vehicle via the automatic control system, and wherein said processing element is also capable of providing power to the automatic control system from an alternative, inaccessible power supply in response to engagement of the automatic control system, and wherein said processing element is further capable of bypassing at least one onboard accessible power control element in response to engagement of the automatic control system so as to provide power to the automatic control system from the alternative, inaccessible power supply via an alternative power control element comprising at least one power limiting element that is also inaccessible.

16. The system according to claim 15, wherein said at least one engagement element is located onboard the vehicle and is capable of receiving an input from onboard the vehicle to engage the automatic control system.

17. The system according to claim 15, wherein said at least one engagement element is located onboard the vehicle and is capable of automatically engaging the automatic control system when the security of the controls onboard the vehicle is jeopardized.

18. The system according to claim 15, further comprising a communication system capable of communicating with at least one location off-board the vehicle via a communication link between the vehicle and the at least one off-board location.

19. The system according to claim 18, wherein one of said at least one engagement element is located outside the vehicle and is capable of remotely engaging the automatic control system via the communication link of said communication system.

20. The system according to claim 18, wherein said processing element is also capable of receiving control commands from at least one location outside the vehicle via the communication link of said communication system.

21. The system according to claim 15, wherein said processing element is also capable of disconnecting onboard controls.

22. The system according to claim 15, further comprising a storage element onboard the vehicle, and wherein said processing element is also capable of receiving predetermined control commands from said storage element for controlling operation of the vehicle via the automatic control system.

23. The system according to claim 15, wherein said at least one engagement element is capable of engaging an automatic flight control system of an air vehicle, wherein said at least one processing element is capable of disabling any onboard capability to supersede the engaged automatic flight control system and any onboard capability to disengage the engaged automatic flight control system, and wherein said at least one processing element is capable of receiving instructions for controlling operation of the air vehicle via the automatic flight control system.

24. The system according to claim 15, further comprising a transmitter and a receiver for establishing a dedicated communications link for communications relating to the automatic control system between the vehicle and a remote location, wherein the dedicated communications link is distinct from any communications link established for other types of communications.

25. The system according to claim 15, wherein the at least one power limiting element comprises at least one circuit breaker.

26. A method of engaging an uninterruptible autopilot mode to automatically control flight operations of an air vehicle, comprising:
   initiating an autopilot system of the air vehicle;
   disconnecting onboard flight controls and bypassing at least one onboard accessible power control element to connect the autopilot system of the air vehicle to an alternative, inaccessible power supply in response to initiation of the autopilot system, such that the uninterruptible autopilot mode of the air vehicle is engaged, wherein bypassing at least one onboard accessible power control element comprises switching from the at least one onboard accessible power control element to an alternative, inaccessible power control element comprising at least one power limiting element so as to supply power via the alternative, inaccessible power control element to the autopilot system from the alternative, inaccessible power supply in response to initiation of the autopilot system; and
   automatically navigating the air vehicle without input from onboard the air vehicle via the uninterruptible autopilot mode of the air vehicle.

27. The method according to claim 26, wherein initiating an autopilot mode of the air vehicle comprises transmitting an uninterruptible autopilot mode signal from onboard the air vehicle to the autopilot system of the air vehicle.

28. The method according to claim 27, wherein transmitting an uninterruptible autopilot mode signal from onboard the air vehicle comprises automatically transmitting an uninterruptible autopilot mode signal upon an occurrence of an event onboard the air vehicle.

29. The method according to claim 26, wherein initiating an autopilot mode of the air vehicle comprises transmitting an uninterruptible autopilot mode signal from a remote location to the autopilot system of the air vehicle.

30. The method according to claim 26, further comprising transmitting a signal from the air vehicle to at least one remote location to indicate that the uninterruptible autopilot mode of the air vehicle has been engaged, subsequent to initiating the autopilot mode of the air vehicle.

31. The method according to claim 26, wherein automatically navigating the air vehicle comprises automatically navigating the air vehicle away from populated areas.

32. The method according to claim 26, wherein automatically navigating the air vehicle comprises automatically navigating the air vehicle to one of a plurality of predetermined landing sites and automatically landing the air vehicle at the landing site.

33. The method according to claim 26, further comprising establishing communications relating to the autopilot system via a dedicated communications link between the air vehicle and a remote location, wherein the dedicated communications link is distinct from any communications link established for other types of communications.

34. The method according to claim 26, wherein the at least one power limiting element comprises at least one circuit breaker.

35. An uninterruptible autopilot system for automatically controlling flight operations of an air vehicle, comprising:
   an autopilot system capable of receiving a signal to initiate the uninterruptible autopilot system of the air vehicle;
   at least one switching element capable of disconnecting onboard manual flight controls and bypassing at least one onboard accessible power control element to connect said autopilot system of the air vehicle to an alternative inaccessible power supply in response to initiation of the autopilot system, such that the uninterruptible autopilot system of the air vehicle is engaged, wherein said at least one switching element is responsive to initiation of the uninterruptible autopilot system so as to bypass at least one onboard accessible power control element by switching from the at least one onboard accessible power control element to an alternative, inaccessible power control element comprising at least one power limiting element so as to supply power via the alternative, inaccessible power control element to the autopilot system from the alternative, inaccessible power supply; and a processing element capable of automatically navigating the air vehicle without input from onboard the air vehicle via the uninterruptible autopilot system of the air vehicle.

36. The system according to claim 35, wherein said autopilot system is capable of receiving a signal from onboard the air vehicle to initiate the uninterruptible autopilot system of the air vehicle.

37. The system according to claim 36, wherein said autopilot system is capable of receiving an automatically generated signal from onboard the air vehicle to initiate the uninterruptible autopilot system of the air vehicle.

38. The system according to claim 35, wherein said autopilot system is capable of receiving a signal from a location off-board the air vehicle to initiate the uninterruptible autopilot system of the air vehicle.

39. The system according to claim 35, wherein said autopilot system is capable of transmitting a signal to at least one remote location to indicate that the uninterruptible autopilot system of the air vehicle has been engaged.

40. The system according to claim 35, wherein said processing element is capable of receiving directions to automatically navigate the air vehicle away from populated areas.

41. The system according to claim 35, wherein said processing element is capable of receiving directions to automatically navigate the air vehicle to one of a plurality of predetermined landing sites and automatically landing the air vehicle at the landing site.

42. The system according to claim 35, wherein said autopilot system comprises said processing element.

43. The system according to claim 35, further comprising a transmitter and a receiver for establishing a dedicated communications link for supporting communications relating to the autopilot system between the air vehicle and a remote location, wherein the dedicated communications link is distinct from any communications link established for other types of communications.

44. The system according to claim 35, wherein the at least one power limiting element comprises at least one circuit breaker.

* * * * *